United States Patent [19]

De Haan et al.

[11] Patent Number: 5,715,335
[45] Date of Patent: Feb. 3, 1998

[54] NOISE REDUCTION

[75] Inventors: Gerard De Haan; Paul W. A. C. Biezen; Olukayode A. Ojo; Tatiana G. Kwaaitaal-Spassova, all of Eindhoven, Netherlands

[73] Assignee: U.S. Philips Corporation, New York, N.Y.

[21] Appl. No.: 223,389

[22] Filed: Apr. 5, 1994

Related U.S. Application Data

[63] Continuation-in-part of Ser. No. 161,955, Dec. 2, 1993, abandoned.

[51] Int. Cl.$^6$ .......................................... G06K 9/40
[52] U.S. Cl. ........................ 382/265; 382/261; 348/627
[58] Field of Search .................... 382/22, 54, 260, 382/261, 263, 264, 265; 348/618, 619, 575, 620, 627

[56] References Cited

U.S. PATENT DOCUMENTS

| | | | |
|---|---|---|---|
| 4,504,864 | 3/1985 | Anastassiou et al. | 348/619 |
| 4,549,212 | 10/1985 | Bayer | 348/618 |
| 4,573,070 | 2/1986 | Cooper | 348/617 |
| 4,962,542 | 10/1990 | Klees | 382/265 |
| 5,282,268 | 1/1994 | Mieras et al. | 382/152 |
| 5,343,254 | 8/1994 | Wada et al. | 348/627 |
| 5,359,674 | 10/1994 | van der Wal | 382/240 |
| 5,384,865 | 1/1995 | Loveridge | 382/262 |
| 5,446,501 | 8/1995 | Takemoto et al. | 348/620 |

FOREIGN PATENT DOCUMENTS

| | | | |
|---|---|---|---|
| 0433866 | 6/1991 | European Pat. Off. | H04N 5/213 |
| 3927101 | 2/1991 | Germany | H04N 9/73 |
| 267688 | 3/1990 | Japan | G06F 15/68 |

OTHER PUBLICATIONS

"Symmetrical Recursive Median Filters Application to Noise Reduction and Edge Detection", by Balon et al, Signal Processing V: Theories and Applications, 1990, pp. 813–816.

"Extended-Order Statistic Filter and Evaluation of Noise Reduction Performance", by Fujii et al, Electronics and Communications in Japan, Part 3, vol. 74, No. 5, 1991, pp. 1–11.

*Primary Examiner*—Leo Boudreau
*Assistant Examiner*—Christopher S. Kelley

[57] ABSTRACT

In a noise reduction filter having a filter coupled to receive a plurality of input signal samples (○,⊕) and furnishing noise-reduced signal samples, and a delay circuit coupled to the output of the filter and which furnishes a plurality of delayed noise reduced signal samples (X) to a further input of the filter, the samples ($Pn_1 \ldots Pn_n$) applied to the filter are not directly neighboring samples.

23 Claims, 3 Drawing Sheets

NOISE REDUCTION

CROSS-REFERENCE TO RELATED APPLICATIONS

This is a continuation-in-part of application Ser. No. 08/161,955, filed Dec. 2, 1993, now abandoned.

BACKGROUND OF THE INVENTION

1. Field of The Invention

This invention relates to a noise reduction filter, more particularly to a filter for image data noise reduction. The invention also relates to a noise reduction filtering method and to an image signal receiver comprising a noise reduction filter.

2. Description of the Related Art

Noise reduction of image data is generally realized through averaging of likely correlated picture elements. The likelihood may be due to spatial or temporal proximity. The closer the proximity, the higher the likelihood that the picture elements (pixels) have the same value if noise were not present. Both linear and non-linear filters have been used for noise reduction purposes, as well as the intermediate solution of adapting filter coefficients to local picture statistics.

The article "Extended-Order Statistic Filter and Evaluation of Noise Reduction Performance", Electronics and Communications in Japan, Part 3, Vol. 74, No. 5, 1991, pp. 1–11, discloses an extended-order statistic filter for image data noise reduction. The distinction between order statistic filters (OSF) and linear filters is that in an OSF, weighting coefficients are not related to the spatial or temporal distance with respect to the current sample, but to the order of the samples after ranking them on the basis of their signal value. In the extended-order statistic filter described in the article, the coefficients not only depend on the order of the signal values, but also on the order of differences between the signal values of neighboring samples and the signal value of the current sample (differential OSF), and further, on the distance to the current sample. It was shown that this type of filter can combine the advantages of linear and non-linear filtering on gaussian noise and impulse noise, respectively. The transversal nature of these filters makes them rather expensive when applied to profit from the temporal correlation in image sequences.

JP-A-2/67,688 shows an image noise removing system in which, to prevent the generation of blur, filter characteristics are based on a relation between a central pixel and a weighted averaged pixel in the case of filtering a pixel positioned on the boundary of blocks. A weighted average of a central pixel and eight neighboring pixels surrounding the central pixel is determined. If the difference between the central pixel and the weighted average is smaller than a threshold, the weighted average is supplied, whereas when the difference exceeds the threshold, the unfiltered central pixel is supplied.

DE-C-39.27.101 shows a noise reduction filter in which a delayed luminance signal and an undelayed luminance signal are only averaged if their difference is smaller than a given value. This corresponds to the noise removing system of JP-A-2/67,688 if, instead of eight neighboring pixels surrounding the current pixel, only one neighboring pixel above the current pixel would be present. All of the disadvantages of the system of JP-A-2/67,688 are still present. In fact, the circuit of DE-C-39.27.101 can be considered as a primitive embodiment of the system of JP-A-2/67,688.

The article "Symmetrical recursive median filters; application to noise reduction and edge detection", by Ph. Bolon et at., Signal Processing V: theories and applications, pp. 813–816 shows a recursive median filter for noise reduction. A median filter is a species of the class of order statistic filters. The symmetrical filter described in the article has the disadvantage that for two-dimensionally filtering a current input pixel, information from the "future" (i.e. pixels below the current pixel when the pixels are scanned from top to bottom) is required, which is unattractive in view of a hardware realization.

SUMMARY OF THE INVENTION

It is, inter alia, an object of the invention to provide a filter which provides a better reduction of low-frequency noise components. For this purpose, a first aspect of the invention provides a noise reduction filter comprising a delay circuit for furnishing delayed signal samples (X) and a filter coupled to receive input signal samples (O.⊕) and the delayed signal samples (X) to furnish noise-reduced signal samples, wherein the samples ($Pn_1 \ldots Pn_n$) applied to the filter are not directly neighboring samples. A second aspect of the invention provides an image signal receiver including a signal processor for processing an image signal and a display unit for displaying the processed image signal, wherein the signal processor comprises a noise reduction filter as described above. A third aspect of the invention provides a noise reduction filtering method in accordance with the first aspect of the invention. Advantageous embodiments of the invention are defined in the claims.

In accordance with the present invention, instead of directly neighboring input pixels, pixels at some horizontal and/or vertical distance are used. It appears that thereby, low-frequency noise components are reduced in addition to the high-frequency noise components which can also be reduced when directly neighboring input pixels are used. In one preferred embodiment, the recursive noise reduction filter receives 5 filtered pixels from the previous line having a distance of 4 pixels between two successive input pixels, 3 unfiltered pixels from the present line having a distance of 2 pixels between two successive input pixels. A ringing effect occurring at edges appears to be reduced when the filtered input samples from the previous line are taken from positions shifted in the horizontal direction line-alternatingly by +1, 0, −1, 0, +1, ... pixels. Many variations in the inter-pixel distance, the number of pixels . used, and the magnitude of the line-alternating shift in the position of the filtered input pixels taken from the previous line are possible. In one embodiment, the inter-pixel distance depends on an edge-detection such that the inter-pixel distance decreases with an increasing difference between a current pixel and one of the neighboring pixels (e.g. the neighboring pixel having the largest distance to the current pixel). The inter-pixel distance may vary separately for left and right neighboring pixels.

These and other aspects of the invention will be apparent from and will be elucidated with reference to the embodiments described hereinafter with reference to the accompanying drawing.

DESCRIPTION OF THE PREFERRED EMBODIMENTS

Figure 1A:
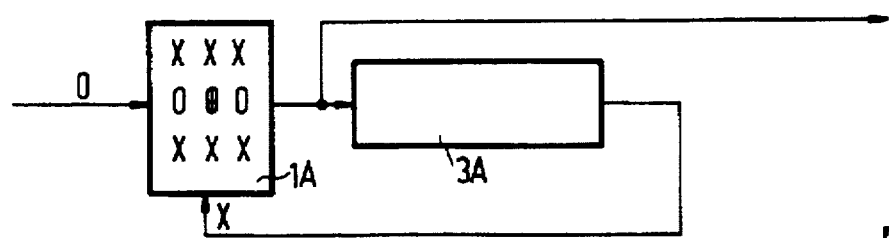
FIGS. 1A and 1B show block diagrams of embodiments of a noise reduction filter in accordance with the present invention.
Figure 1B:
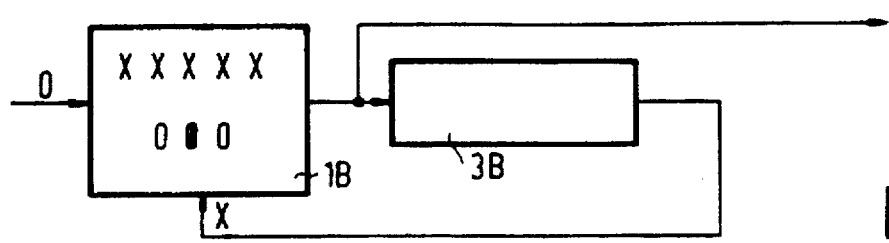

The embodiments of the invention shown in FIGS. 1A, 1B concern nonlinear recursive spatial or spatio-temporal filters. Other embodiments relate to transversal noise-reduction filters, while the invention is not limited to non-linear filters. Experiments indicate that the filters are attractive for use in future television receivers as their performance is certainly superior to that of the presently used motion-adaptive temporal recursive filters, while their complexity is practically equivalent. In a preferred embodiment, for every pixel position $p=(x, y, t)^T$, with T indicating transposition, and input luminance signal $F(p)$, the proposed filter output $F_F(p)$ will be defined as:

$$F_F(\underline{p}) = G(\underline{p}) \cdot \tag{1}$$

$$\left( F(\underline{p}) + \gamma \cdot \sum_{\underline{n} \in N_1} \alpha(\underline{p},\underline{n}) \cdot F(\underline{p}+\underline{n}) + \delta \cdot \sum_{\underline{n} \in N_2} \beta(\underline{p},\underline{n}) \cdot F_F(\underline{p}+\underline{n}) \right)$$

where $N_1$ and $N_2$ are sets of vectors defining one, two, or three-dimensional neighborhoods. The recursivity of the filter results from the third term of equation (1) where the constant $\delta$ controls the amount of recursivity. Further, in accordance with the present embodiment of the invention and in contradistinction to an OSF or a differential OSF, filter weighting coefficients $\alpha(p, n)$ and $\beta(p, n)$ are related to the absolute difference between the weighted pixel and the current input pixel:

$$\alpha(p, n) = f_1(|F(p) - F(p+n)|)$$

$$\beta(p,n) = f_2(|F(p) - F_F(p+n)|) \tag{2}$$

with $f_1$ and $f_2$ monotonously decreasing functions. In equation (1), G is a gain or normalization factor:

$$\frac{1}{G(\underline{p})} = 1 + \gamma \cdot \sum_{\underline{n} \in N_1} \alpha(\underline{p},\underline{n}) + \delta \cdot \sum_{\underline{n} \in N_1} \beta(\underline{p},\underline{n}) \tag{3}$$

An attractive implementation results if the filter weighting coefficients are selected according to:

$$\alpha(\underline{p},\underline{n}) = \begin{cases} 1, & (|F(\underline{p}+\underline{n}) - F(\underline{p})| < Th_1) \\ W, & (Th_1 \leq |F(\underline{p}+\underline{n}) - F(\underline{p})| < Th_2) \\ 0, & (|F(\underline{p}+\underline{n}) - F(\underline{p})| \geq Th_2) \end{cases} \tag{4}$$

and:

$$\beta(\underline{p},\underline{n}) = \begin{cases} 1, & (|F_F(\underline{p}+\underline{n}) - F(\underline{p})| < Th_1) \\ W, & (Th_1 \leq |F_F(\underline{p}+\underline{n}) - F(\underline{p})| < Th_2) \\ 0, & (|F_F(\underline{p}+\underline{n}) - F(\underline{p})| \geq Th_2) \end{cases} \tag{5}$$

respectively. Allowing only spatial recursion (only line memories, no field memories), good results were obtained using the following neighborhoods:

$$N_1 = \left\{ \begin{pmatrix} 2 \\ 0 \\ 0 \end{pmatrix}, \begin{pmatrix} -2 \\ 0 \\ 0 \end{pmatrix} \right\} \tag{6}$$

and:

$$N_2 = \left\{ \begin{pmatrix} 0 \\ -2 \\ 0 \end{pmatrix}, \begin{pmatrix} 4 \\ -2 \\ 0 \end{pmatrix}, \begin{pmatrix} -4 \\ -2 \\ 0 \end{pmatrix}, \begin{pmatrix} 8 \\ -2 \\ 0 \end{pmatrix}, \begin{pmatrix} -8 \\ -2 \\ 0 \end{pmatrix} \right\} \tag{7}$$

while selecting W=0.25, $Th_2$=4.$Th_1$, and $\gamma=\delta=1$, where $Th_1$ was adapted to the noise level. As can be seen from equations (6) and (7), the neighborhoods are selected such that pipe-lining of the algorithm implemented in a very large scale integration (VLSI) is simple.

When allowing for field memories in the design, a three-dimensional noise reduction filter can be realized, for which experimentally good results could be shown, applying the following neighborhoods:

$$N_1 = \left\{ \begin{pmatrix} 2 \\ 0 \\ 0 \end{pmatrix}, \begin{pmatrix} -2 \\ 0 \\ 0 \end{pmatrix} \right\} \tag{8}$$

and:

$$N_2 = \left\{ \begin{pmatrix} 0+D_x \\ 1+D_y \\ -T \end{pmatrix}, \begin{pmatrix} 0+D_x \\ -1+D_y \\ -T \end{pmatrix}, \begin{pmatrix} 4+D_x \\ 1+D_y \\ -T \end{pmatrix}, \right. \tag{9}$$

$$\left. \begin{pmatrix} 4+D_x \\ -1+D_y \\ -T \end{pmatrix}, \begin{pmatrix} -4+D_x \\ 1+D_y \\ -T \end{pmatrix}, \begin{pmatrix} -4+D_x \\ -1+D_y \\ -T \end{pmatrix} \right\}$$

where $D(x,t)=D_x, D_y)^T$ is the displacement vector describing the motion between field at time t and the previous field at time t-T, while selecting W=0.25, $Th_2$=4.$Th_1$, and $\gamma=\delta=1$, where $Th_1$ was adapted to the noise level as will be discussed below. In equation (9), T is the field period of the video signal, which equals 20 ms in a 50 Hz environment. Obviously, if no motion vectors are available, D(x,t) can be taken 0. Again, as can be seen from the equations (9) and (10), the neighborhoods are selected taking implementation aspects, pipe-lining of the algorithm, into account. To obtain both spatial and temporal recursion, the set $N_2$ may be the union of the sets given in the equations (7) and (9).

In the noise reduction filter embodiments of FIGS. 1A and 1B, the input to the difference-dependent weighted average calculation circuit 1A, 1B includes the current sample ⊕ and several neighboring samples O and X, whereby part of the neighboring samples 0 and X are previously filtered samples X. In an image processing system, the delay of the delay circuit 3A, 3B in the feedback loop may be a line period (FIG. 1B), a field period or a picture period (FIG. 1A), plus or minus some pixel delays. When the delay is a field or picture period, the feedback loop preferably includes a motion compensation circuit to obtain a better matching of the pixels on which the recursive noise reduction filtering is based. FIG. 1A shows an embodiment of an interfield noise reduction filter in which the delay of the delay circuit 3A is a field or a picture delay, so that the neighboring fed-back pixels X may originate from both above and below the line comprising the current pixel ⊕; the left and right adjacent pixels O are from the same line and field as the current pixel ⊕. FIG. 1B shows an embodiment of an intra-field noise reduction filter in which the delay of the delay circuit 3B is a line delay, so that the neighboring fed-back pixels X originate from the line above the line comprising the current pixel ⊕; the left and right adjacent pixels O are from the same line as the current pixel ⊕.

In accordance with the present invention, instead of using directly neighboring input pixels, pixels at some horizontal and/or vertical distance are used. It appears that thereby, low-frequency noise components are reduced in addition to the high-frequency noise components which can also be reduced when directly neighboring input pixels are used. In one preferred embodiment, the recursive noise reduction filter receives 5 filtered pixels from the previous line having a distance of 4 pixels between two successive input pixels, 3 unfiltered pixels from the present line having a distance of 2 pixels between two successive input pixels. A ringing effect occurring at edges appears to be reduced when the filtered input samples from the previous line (neighborhood $N_2$) are taken from positions shifted in the horizontal direction line-alternatingly by +1, 0, −1, 0, +1, . . . pixels. Many variations in the inter-pixel distance, the number of pixels used, and the magnitude of the line-alternating shift in the position of the filtered input pixels taken from the previous line are possible. In one embodiment, the inter-pixel distance depends on an edge-detection such that the interpixel distance decreases with an increasing difference between a current pixel and one of the neighboring pixels (e.g. the neighboring pixel having the largest distance to the current pixel). The inter-pixel distance may vary separately for left and right neighboring pixels. A simple alternative for an edge-dependent switching of the filter is to give the pixel directly above the current pixel a weighting coefficient which is larger, for example, four times larger, than the weight it would have received in view of other considerations.

Figure 2A:
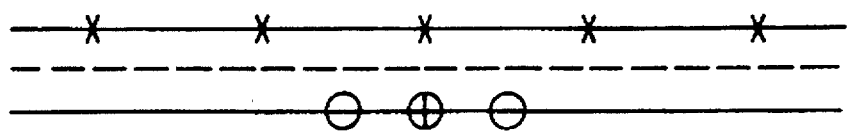
FIGS. 2A–2D show several configurations of neighboring pixels.
Figure 2B:
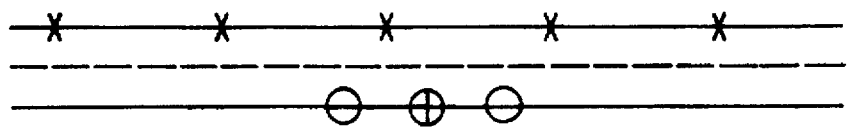
Figure 2C:
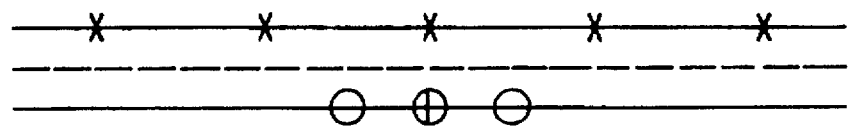
Figure 2D:
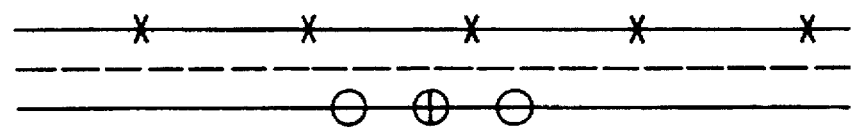

FIGS. 2A–2D show several configurations of neighboring pixels. FIG. 2A shows the neighborhoods of formulae 6 and 7. FIGS. 2A–2D show the line-alternating shift by +/−1 pixel in the horizontal direction.

Figure 4:
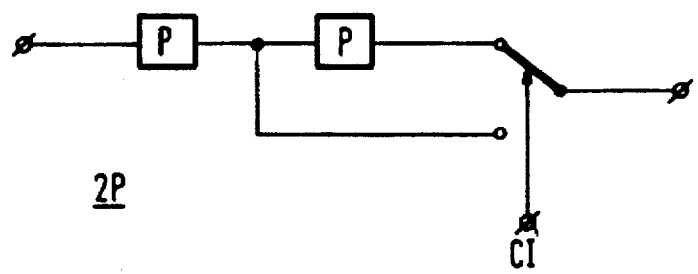
FIG. 4 shows a switchable two-pixel delay circuit for use in the noise reduction filter of FIG. 3.
Figure 3:
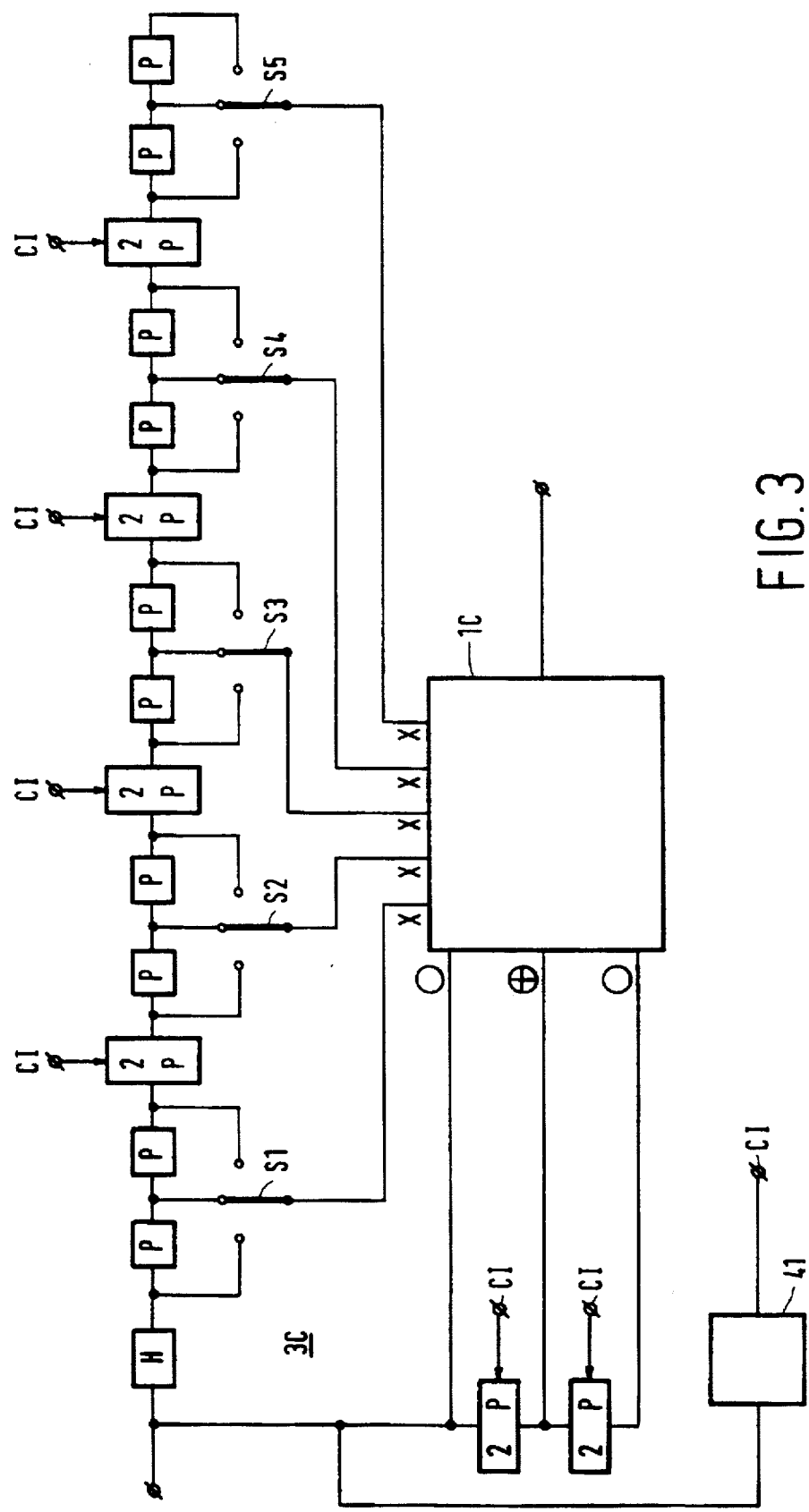
FIG. 3 shows an embodiment of a transversal noise reduction filter in accordance with the present invention.

FIG. 3 shows an embodiment of a transversal noise reduction filter in accordance with the present invention. The input signal is applied to a tapped delay line 3C comprising a delay circuit H providing about one line delay, pixel delay circuits P and switchable two-pixel delay circuits 2P. The switchable two-pixel delay circuits 2P have a control input CI. If a control signal is applied to these control inputs CI, the delay period is shortened to a single pixel period. This can easily be achieved if the switchable two-pixel delay circuits 2P comprise a series connection of two pixel delay circuits P, and a switch to select the output of the first or the second pixel delay circuit P under control of the control signal applied to the control input CI as shown in FIG. 4. Switches S1–S5 select taps of the delay line 3C in a line-alternating manner to provide the sequence of pixel neighborhoods shown in FIGS. 2A–2D. Outputs of the switches S1–S5 are applied to an averaging circuit 1C for providing 5 pixels X of the previous line thereto. The input of the noise reduction filter is also applied to a cascade connection of two switchable two-pixel delay circuits 2P, so as to provide a delay line having three taps for providing three pixels O of the current line. The input of the noise reduction filter is further applied to an edge detector 41 for generating the control input signal CI for the two pixel delay circuits 2P.

Figure 5:
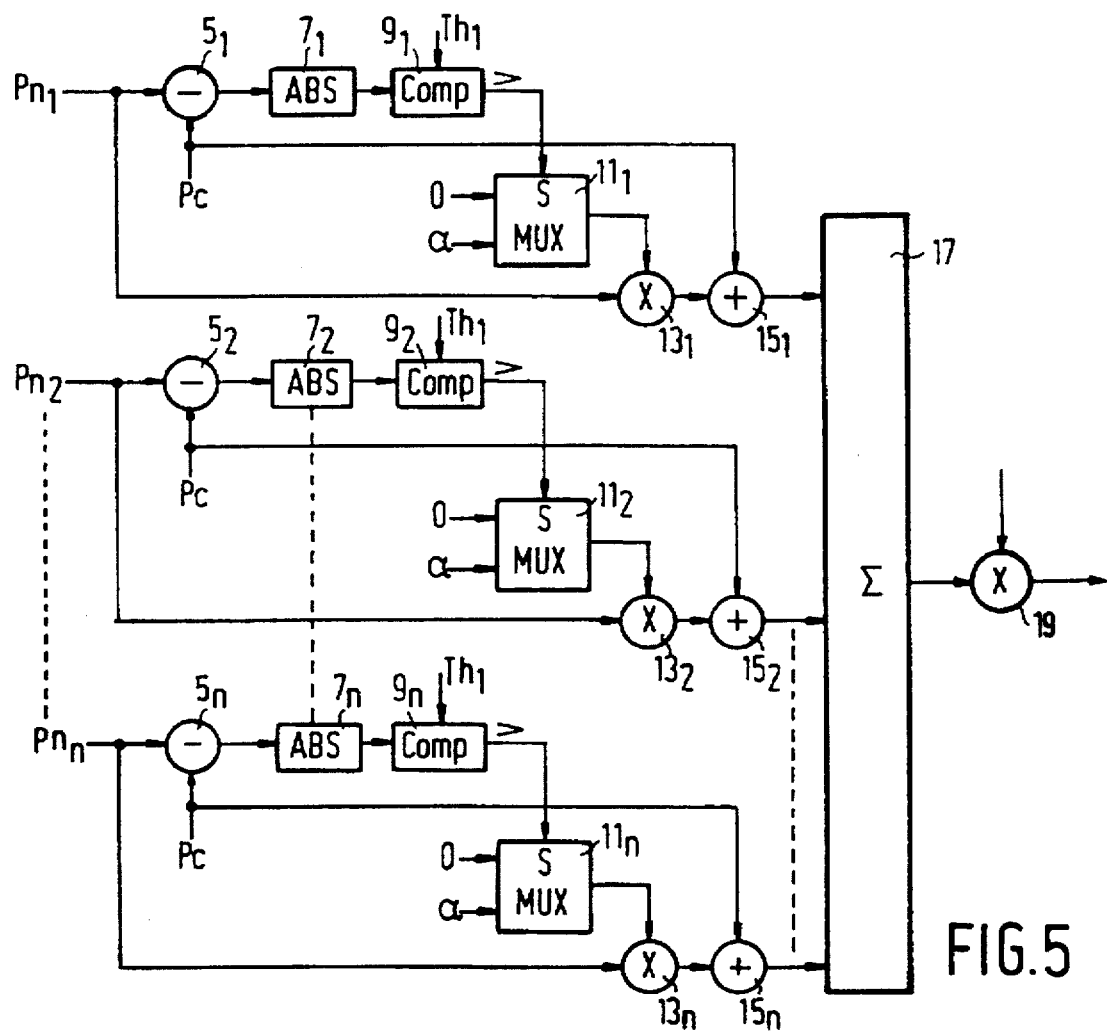
FIG. 5 shows a block diagram of a preferred difference-dependent weighted average filter for use in the noise reduction filters of FIGS. 1A, 1B and 3.

An attractive implementation of the difference-dependent weighted average calculating circuit is given in FIG. 5. The differences of all pixels in the filter window N1 plus N2 (in FIG. 5 indicated as $Pn_1$ . . . $Pn_n$) with respect to the current input sample Pc, are calculated by subtracters 5 and absolute value determining circuits 7, and compared with a threshold $Th_1$ by comparators 9. The pixels for which the difference with the current sample is below the threshold $Th_1$ are averaged and the result is applied to the output of the noise reduction filter which is also the input of the delay circuit.

This action is carded out by multiplexers 11 controlled by the comparators 9 to furnish a weighting coefficient O when the difference is above the threshold $Th_1$ and to furnish a weighting coefficient α when the difference is below the threshold $Th_1$. Multipliers 13 multiply the neighboring pixels Pn with their respective weighting coefficients. The circuit of FIG. 5 is somewhat simplified with regard to equation (4): those differences between the neighboring pixel values Pn and the current pixel value Pc which are smaller than the threshold $Th_1$ result in a coefficient α for the corresponding neighboring pixel value Pn, while the differences exceeding the threshold value $Th_1$ result in a coefficient O for the corresponding neighboring pixel value Pn. The current sample Pc is added to the weighted neighboring pixels Pn by adders 15, whose output signals are summed by an adder 17. The output of the adder 17 is multiplied by a gain coefficient to yield the output signal of the difference-dependent weighted average filter. When α equals 1, a simple average is used; when α differs from 1, a weighted average is used.

Rather than applying binary valued coefficients only, three or four different coefficient values (alpha 1, 2 . . . n) can be applied, where the coefficients with the smallest value are assigned using the highest threshold ($Th_1$, $Th_2$, . . . $Th_n$). Furthermore, as indicated in equation (2), the weights for previously filtered pixels can be selected different (β rather than α).

As mentioned hereinbefore, the threshold $Th_1$ (and therefore also $Th_2$, which has a fixed relation to $Th_1$) is preferably adapted to the noise level. A global adaptation (i.e. an adaptation for a whole picture) is conceivable and indeed proves useful. Hereinafter, a somewhat more sophisticated option adapting to local image characteristics is described. To this end, the image is divided into non-overlapping blocks B(X), where $X=(X, Y)^T$ is the center of the block. To each block a value of $Th_1$ is assigned, the calculation of which is based upon the $Th_t$ value in the previous field (temporal recursive adaptation process):

$$Th_1(X, t) = Th_1(X, t-T) - \Delta(X, t) \qquad (10)$$

with:

$$\Delta(\underline{X}, t) = C_1 \cdot \left( \sum_{\underline{x} \in B(\underline{X})} |F_F(\underline{X} + \underline{x}, t - T) - F(\underline{X} + \underline{x}, t - T)| - MinMad(t) \right) \qquad (11)$$

where MinMad is an estimated value of the noise level in the field, and $C_1$ is a constant.

A possible simplification is to use a sign function according to:

$$\Delta(\underline{X}, t) = C_1 \cdot \qquad (12)$$

$$SIGN \left( \sum_{\underline{x} \in B(\underline{X})} |F_F(\underline{X} + \underline{x}, t - T) - F(\underline{X} + \underline{x}, t - T)| - MinMad(t) \right)$$

where SIGN(α) is defined according to:

$$SIGN(a) = \begin{cases} -1, & (a < 0) \\ +1, & (a \geq 0) \end{cases} \qquad (13)$$

Experiments showed that MinMad(t) is preferably equal to the minimum in a field at time t of the motion-compensated summed absolute difference over a block of two successive fields:

$$MinMad(t) = \min_{\forall \underline{X} \in \text{Field}} \sum_{\underline{x} \in B(\underline{X})} |F(\underline{x},t) - F(\underline{x} - \underline{D}(\underline{X},t), t-T)| \quad (14)$$

where D(X, t) is the displacement vector found with a motion estimator for the block B(X) at time t. The philosophy behind this choice is that MinMad(t) thus reflects the noise in the picture assuming that the estimator at least at one block of the image is converged completely.

In an attractive implementation, the motion estimator and the noise reduction circuit would share the picture memories, which is possible because the sum in equation (14) corresponds to the match error of the motion estimator. In this situation, however, the measured MinMad(t) corresponds to the reduced noise level, which is preferably corrected for the amount of filtering applied. Experimentally, it was verified that the following correction, the result of which is called ModMad(t), yields satisfactory results:

$$ModMad(t) = ModMad(t-T) - Mod(t) \quad (15)$$

where Mod(t) is found according to:

$$Mod(t) = C_2 \cdot \left( \frac{MinMad(t)}{C_3 \cdot \sum_{\underline{x} \in B(\underline{X})} G(\underline{x},t)} - ModMad(t-T) \right) \quad (16)$$

where B(X) is the block where MinMad(t) was found, while $C_2$ and $C_3$ again are experimentally optimized constants. The first time ModMad(t) is calculated, Modmad(t−T) is assumed to be zero.

Rather than adapting $Th_1$ per block in the picture, or additional to it, local adaptation of γ and δ in equation (1) can be considered.

It should be noted that the above-mentioned embodiments illustrate rather than limit the invention, and that those skilled in the art will be able to design many alternative embodiments without departing from the scope of the appended claims. Whenever a first item is said to depend on a second item, it should be borne in mind that it is not excluded that the first item also depends on a third item.

As an alternative to the use of the recursive noise reduction filter of FIG. 5 using all neighboring samples which differ by less than a (noise adapted) threshold from the current pixel value, it is possible to average the n least differing (compared to the current pixel) pixel values, in which case n depends on the noise level.

In a television signal receiver having a luminance noise reduction filter and a chrominance noise reduction filter, filter coefficients of the chrominance noise reduction filter are preferably dependent on differences between neighboring luminance pixel values. This yields as an unexpected advantage that cross-color is reduced. This effect can be explained as follows. Suppose an e.g. horizontal high-frequency luminance pattern. The horizontal high-frequency luminance pattern will cause an undesired cross-color having vertical components. To avoid damage to the horizontal high-frequency information by the noise reduction filtering, the noise reduction filtering will be predominantly vertically oriented. Such a vertically oriented noise reduction filtering will not only filter the vertical noise components, but also the vertical cross-color components and thus reduce the cross-color.

Thus, in accordance with the present invention, a family of noise reduction filters is proposed which experimentally shows a particularly good suitability for noise reduction application in image data processing. It concerns a class of spatial and spatio-temporal filters, for which options are given to adapt to noise level and local image characteristics. In embodiments of the noise reduction filter in accordance with the present invention, weights are related to the absolute difference between samples. It is shown that particularly multi-dimensional recursive variants of this nonlinear filter family are attractive for noise reduction of images. The recursivity can be designed to facilitate implementation at high processing speed, i.e. the definition of the noise reduction filter allows for pipe-lining. In the case of temporal recursion, motion compensation turns out to increase the performance. An attractive implementation of the weight calculation circuit is provided, and methods are indicated to adapt the filter to the noise level in the picture and to the local characteristics of the picture.

We claim:

1. A luminance signal noise reduction filter comprising:
   delay means for furnishing delayed signal samples (X); and
   a filter coupled to a signal input terminal to receive input luminance signal samples (o,⊕) and to said delay means to receive said delayed signal samples (X) thereby to furnish noise-reduced signal samples, wherein
   all said signal samples ($Pn_1 \ldots Pn_n$) applied to said filter are not-directly neighboring samples and said delayed samples (X) are from a previous line and are taken from positions line-alternatingly shifted in the horizontal direction.

2. A noise reduction filter as claimed in claim 1, further comprising an edge detector wherein a distance between said not-directly neighboring samples depends on an edge-detection such that said distance decreases with an increasing difference between a current sample (⊕,Pc) and one of said not-directly neighboring samples.

3. A noise reduction filter as claimed in claim 1, wherein said input samples are all on one horizontal line of an image signal and said delayed signal samples are all on one or more liens other than said one horizontal line.

4. A noise reduction filter as claimed in claim 1, wherein said filter comprises a weighted average filter in which weighting coefficients assigned to samples ($Pn_1 \ldots Pn_n$) of said input signal (O) and said delayed signal (X) depend on respective differences between a current sample (⊕,Pc) of said input signal and said samples ($Pn_1 \ldots Pn_n$) of said input signal (O) and said delayed signal (X) and a first weighting coefficient is assigned to samples ($Pn_1 \ldots Pn_n$) of said input signal (O) and said delayed signal (X) differing by less than a threshold value from said current sample (⊕,Pc) of said input signal, whereas weighting coefficients that differ from said first weighting coefficient are assigned to samples ($Pn_1 \ldots Pn_n$) of said input signal (O) and said delayed signal (X) which differ by more than said threshold value from said current sample (⊕,Pc) of said input signal, said threshold value depending on a minimum in a field of a motion-compensated difference between two successive fields.

5. A noise reduction filter as claimed in claim 4, wherein a second weighting coefficient smaller than said first weighting coefficient is assigned to those samples ($Pn_1 \ldots Pn_n$) which differ from the current sample (⊕,Pc) by more than said first-mentioned threshold value and by less than a second threshold value, which second threshold value is larger than said first threshold value.

6. A noise reduction filter as claimed in claim 4, wherein said threshold value depends on the noise level.

7. A noise reduction filter as claimed in claim 4, wherein weighting coefficients for a chrominance signal noise reduction filtering depend on differences between neighboring luminance sample values.

8. A noise reduction filter as claimed in claim 1, wherein said delay means comprise motion vector compensation means.

9. An image signal receiver comprising a signal input for receiving an image signal, a signal processor for processing said image signal, and a display unit for displaying the processed image signal, wherein said signal processor comprises a noise reduction filter as claimed in claim 1.

10. A noise reduction filter comprising:
   an input terminal for receiving an input video signal made up of plural lines of pixels,
   a delay circuit,
   a first tapped pixel delay line,
   means coupling said delay circuit and said first tapped pixel delay line in cascade to said input terminal,
   an averaging circuit having a first plurality of inputs coupled to respective tap points on said first tapped pixel delay line so as to receive delayed pixels of a prior line of pixels wherein said delayed pixels are not directly neighboring pixels,
   a second tapped pixel delay line coupled to said input terminal and having tap points coupled to further respective inputs of the averaging circuit so as to supply the averaging circuit with pixels of a current line of pixels, and wherein
   said averaging circuit has an output terminal for supplying a filtered output video signal with reduced low frequency noise components.

11. The noise reduction filter as claimed in claim 10 wherein said delay circuit provides a one line delay so that said averaging circuit receives pixels from adjacent lines of said input video signal, said filter further comprising,
   switching means for selectively coupling said first plurality of inputs of the averaging circuit to selected tap points on said first tapped pixel delay line.

12. The noise reduction filter as claimed in claim 11 further comprising,
   an edge detector circuit coupled to said input terminal so as to derive a control signal determined by the distance between a current pixel sample and one of the not directly neighboring pixels, and
   means coupling said control signal to control inputs of given delay elements of said first and second tapped pixel delay lines so as to control said given elements whereby the distance between said not directly neighboring pixels decreases as the difference between said current pixel sample and said one not directly neighboring pixel increases.

13. The noise reduction filter as claimed in claim 12 wherein said first tapped pixel delay line comprises a plurality of one-pixel delay elements interspersed with said given delay elements which comprise switchable two-pixel delay elements, and
   said given delay elements of the second tapped pixel delay line comprise at least first and second switchable two-pixel delay elements.

14. The noise reduction filter as claimed in claim 11 wherein said switching means periodically switch connections to said tap points in a horizontal line oscillating pattern.

15. The noise reduction filter as claimed in claim 10 wherein said output terminal of the averaging circuit is coupled to said input terminal.

16. The noise reduction filter as claimed in claim 10 wherein said averaging circuit provides said filtered output video signal with filter weighting coefficients related to an absolute difference between a weighted pixel and the current input pixel.

17. A noise reduction filter comprising:
   delay means for furnishing a plurality of delayed signal samples (X);
   a weighted average filter coupled to a signal input terminal to receive a plurality of input signal samples (O,⊕) and to said delay means to receive said delayed signal samples (X) thereby to furnish noise-reduced signal samples to said delay means, wherein signal samples ($Pn_1 \ldots Pn_n$) applied to said weighted average filter are not-directly neighboring samples, and
   means for assigning weighting coefficients to the samples ($Pn_1 \ldots Pn_n$) of said input signal (O) and to said delayed signal (X) which depend on respective differences between a current sample (⊕,Pc) of said input signal and said samples ($Pn_1 \ldots Pn_n$) of said input signal (O) and said delayed signal (X).

18. A noise reduction filter as claimed in claim 1, wherein said filter comprises a weighted average filter in which weighting coefficients assigned to samples ($Pn_1 \ldots Pn_n$) of said input signal (O) and said delayed signal (X) depend on respective differences between a current sample (⊕,Pc) of said input signal and said samples ($Pn_1 \ldots Pn_n$) of said input signal (O) and said delayed signal (X).

19. A luminance signal noise reduction filtering method comprising the steps of:
   supplying to a filter delayed signal samples wherein the positions of all said delayed signal samples from a previous line are line-alternatingly shifted in the horizontal direction on a line-by-line basis,
   supplying to the filter input luminance signal samples that are not directly neighboring samples, and
   filtering by means of said filter said input luminance signal samples and said delayed signal samples to furnish noise-reduced signal samples.

20. The noise reduction filter as claimed in claim 10 wherein said first tapped pixel delay line comprises a plurality of one-pixel delay elements interspersed with switchable two-pixel display elements, and
   the second tapped pixel delay line comprises switchable two-pixel delay elements.

21. A noise reduction filter comprising:
   an input terminal for receiving an input video signal made up of plural lines of signal samples,
   a filter having an input coupled to the signal input terminal to receive the input signal samples and having an output,
   delay means for deriving delayed signal samples and having an input coupled to the output of the filter and an output coupled to a further input of the filter to supply the delayed signal samples to the filter, and wherein
   all the signal samples received by the filter are not directly neighboring samples and said delayed samples are from a previous line and are taken from positions line-alternatingly shifted in the horizontal direction on a line-by-line basis, whereby a filtered output video signal with reduced noise is produced at the output of the filter.

22. The noise reduction filter as claimed in claim 21 wherein said delayed samples are horizontally shifted in an oscillating pattern.

23. The noise reduction filter as claimed in claim 1 wherein said delayed samples are horizontally shifted in an oscillating pattern.

* * * * *